Patented July 18, 1950

2,515,723

UNITED STATES PATENT OFFICE 2,515,723

DIBENZANTHRONE DYESTUFF

Fritz Max, Easton, Pa., and Wilhelm Schmidt-Nickels, Little York, N. J., assignors to General Aniline & Film Corporation, New York, N. Y., a corporation of Delaware No Drawing. Application October 1, 1947,
Serial No. 777,372

6 Claims. (Cl. 260—338)

This invention relates to new and valuable vat dyestuffs of the dibenzanthrone series, and particularly to ethers of Bz-2,Bz-2'-dihydroxy-dibenzanthrone which yield brilliant blue colorations of excellent fastness to washing, chlorine, and light when applied for dyeing materials by vat dyeing processes.

The dyestuffs of our invention are obtained by reacting a Bz-2,Bz-2'-dihydroxy-dibenzanthrone with a 9,9-dihalo-fluorene, especially a 9,9-dichloro-fluorene, said intermediates being unsubstituted or containing one or more nuclear substituents of the class consisting of halogen, alkyl and alkoxy groups. The resulting dyestuffs are cyclic di-ethers of dibenzanthrone, having the following nuclear structure:

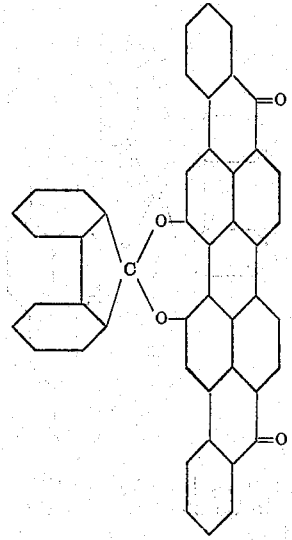

said compound being unsubstituted or containing one or more nuclear substituents of the class consisting of halogen, alkyl groups and alkoxy groups.

Alkyl ethers of Bx-2,Bz-2'-dihydroxy-dibenzanthrone were known heretofore, certain of them being disclosed in U. S. Patent No. 1,531,261. A number of dyestuffs disclosed in this patent were obtained by condensation of dihydroxy-dibenzanthrone with alkylating agents containing two halogens on the same carbon atom. The resulting dyestuffs, however, were found to be of no commercial value because of inadequate fastness to water-spotting and to light, and in the case of blue dyestuffs, because they produced dull shades decidedly inferior to colorations obtained by blue vat dyestuffs of the indanthrone series.

We have found that the vat dyestuffs produced as indicated above by condensing a 9,9-dihalo-fluorene with a Bz-2,Bz-2'-dihydroxy-dibenzanthrone to form a cyclic di-ether, not only yield brilliant blue shades, fast to washing and light and of high tinctorial strength, comparable with corresponding properties of blue vat dyestuff of the indanthrone series, but that such dyestuffs surpass the indanthrone dyestuffs in fastness to chlorine.

The dyestuffs of this invention can be prepared by heating a Bz-2,Bz-2'-dihydroxy-dibenzanthrone, unsubstituted or containing nuclear substituents as indicated above, with a 9,9-dihalo-fluorene, preferably a 9,9-dichloro-fluorene, which can also be unsubstituted or contain substituents of the aforesaid class in an inert organic solvent such as nitrobenzene and in the presence of a hydrogen halide acceptor such as sodium acetate or sodium carbonate, until the hydroxy groups of the dibenzanthrone compound are substantially completely reacted with the fluorene compound. The reaction is favored by relatively high temperatures, e. g. above 180° C., and preferably between 200 and 220° C. Instead of the dihydroxy-dibenzanthrone compound, the corresponding alkali metal salt can be used, in which case the amount of hydrogen halide acceptor employed can be correspondingly reduced, since the alkali metal contained in the dihydroxy-dibenzanthrone salt serves to neutralize part of the hydrogen halide. The reaction requires a relatively long period, e. g. about 15 to 25 hours, to insure a high yield of the desired etherification product. The dyestuffs obtained dye cotton and other cellulose fibers from a blue vat in bright blue shades of excellent fastness to washing, chlorine, and light, as well as to acids and alkalies.

If desired, blue vat dyestuffs of this invention can be converted into the alkali metal salt of the sulfuric acid ester of the corresponding leuco compound by the usual methods, for example, by reduction of the dyestuff with a hydrogen-liberating metal such as iron or zinc, preferably accompanied by a minor amount of copper, in a mixture of chlorsulfonic acid and pyridine, followed by drowing of the reaction mixture in an aqueous alkali metal carbonate solution, and salting out of the resulting leuco ester salt after removal of the pyridine by distillation. The resulting leuco sulfuric acid ester salts yield shades having color and fastness properties similar to those obtained by vat dyeing processes from the original dyestuffs, upon application by printing or dyeing to the material, and development of the color by treatment with an acid oxidizing bath.

A preferred method of preparing the dyestuffs of our invention is illustrated by the following example, wherein parts and percentages are by weight unless otherwise indicated, and temperatures are in degrees centigrade.

*Example*

A mixture of 48.8 parts (0.1 mol) of Bz-2,Bz-2'-dihydroxy-dibenzanthrone, 70.5 parts (0.3 mol) of 9,9-dichloro-fluorene, and 49.2 parts (0.6 mol) of anhydrous sodium acetate in 540 parts of nitrobenzene is agitated, while heating at a temperature of 200 to 205°, for 20 hours. Acetic acid, formed during the reaction, is removed by distillation. At the end of this period an additional 23.5 parts (0.1 mol) of 9,9-dichloro-fluorene is introduced, and agitation continued at the same temperature for about 5 hours. The reaction mixture is filtered while hot, and the filter cake washed with hot nitrobenzene to dissolve all of the reaction product. The resulting nitrobenzene solution is evaporated to a volume corresponding to the volume of 375 parts of water, and cooled, whereupon the dyestuff precipitates in crystalline form. The crystalline dyestuff is separated from the mother liquor by filtration, washed successively with nitrobenzene, alcohol and water, and finally dried.

The dyestuff obtained in the foregoing example dissolves in aqueous alkaline hydrosulfite solutions to form a blue vat which, when applied to cotton or other cellulosic fibers, and developed in the usual manner thereon, yields attractive blue shades of excellent fastness to washing, chlorine, light, acids and alkalies, the shade produced being of a brightness comparable with that obtained with blue vat dyestuffs of the indanthrone series. The dyestuffs can also be applied in a printing composition for the production of blue prints on cellulosic materials.

Similar dyestuffs are obtained by employing, instead of Bz-2,Bz-2'-dihydroxy-dibenzanthrone and 9,9-dichloro-fluorene in the foregoing example, equivalent quantities of nuclear substitution products of either or both of these intermediates, containing halogen, alkyl or alkoxy groups as nuclear substituents. Such substituents include for example chlorine, bromine, iodine, and lower alkyl or alkoxy groups containing 1 to 2 carbon atoms. If desired, such substituents can be introduced into the nucleus of the unsubstituted dyestuff, after preparation according to the example.

To insure good yields, the amount of 9,9-dihalo-fluorene employed is preferably several times the amount theoretically required for cyclic etherification of the amount of dihydroxy-dibenzanthrone (e. g. 3 to 4 times said amount); while the amount of hydrogen halide acceptor is preferably in excess of the amount theoretically required to react with all of the halogen contained on the 9 carbon atom of the 9,9-dihalo-fluorene compound. If an alkali metal salt of the dihydroxy-dibenzanthrone compound is used, a correspondingly smaller amount of hydrogen halide acceptor can be employed. Other high-boiling inert organic solvents can be substituted for nitrobenzene, and other hydrogen halide acceptors, particularly alkali metal salts of monocarboxylic acids or alkali metal carbonates can be used.

Other variations and modifications can be made in the foregoing procedure without departing from the scope or nature of the invention.

We claim:
1. A vat dyestuff of the class consisting of a compound having the following formula:

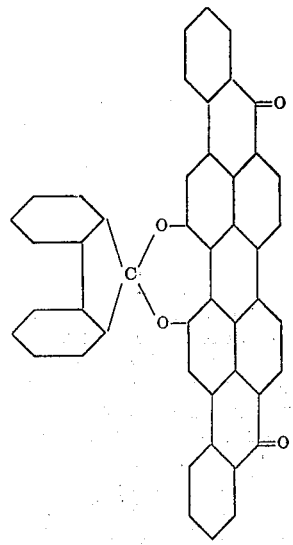

and nuclear halo-, alkyl-, and alkoxy-derivatives thereof.

2. A vat dyestuff having the following formula:

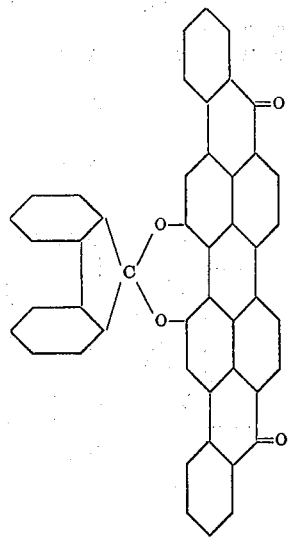

3. An alkali metal salt of the sulfuric acid ester of the leuco compound of a dyestuff as defined in claim 1.

4. An alkali metal salt of the sulfuric acid ester of the leuco compound of the dyestuff defined in claim 2.

5. A process for preparing a blue vat dyestuff of the dibenzanthrone series which comprises reacting one mol of a compound of the class consisting of Bz-2,Bz-2'-dihydroxy-dibenzanthrone and halo-, alkyl-, and alkoxy-derivatives thereof, and alkali metal salts of these compounds, with one mol of a compound of the class consisting of 9,9-dihalo-fluorene and nuclear halo-, alkyl-, and alkoxy-derivatives thereof, at a temperature of at least 180° C., so as to form a cyclic ether.

6. A process for preparing a blue vat dyestuff of the dibenzanthrone series which comprises reacting one mol of Bz-2,Bz-2'-dihydroxy-dibenzanthrone with one mol of 9,9-dichloro-fluorene at a temperature of at least 180° C., so as to form a cyclic ether.

FRITZ MAX.
WILHELM SCHMIDT-NICKELS.

REFERENCES CITED

The following references are of record in the file of this patent:

UNITED STATES PATENTS

| Number | Name | Date |
|---|---|---|
| 2,218,663 | Stallmann | Oct. 22, 1940 |
| 2,318,266 | Stallmann | May 4, 1943 |